United States Patent [19]
Tomisawa

[11] Patent Number: 5,774,590
[45] Date of Patent: Jun. 30, 1998

[54] IMAGE DATA REPRODUCING APPARATUS

[75] Inventor: Shinichiro Tomisawa, Gifu-ken, Japan

[73] Assignee: Sanyo Electric Co., Ltd., Osaka, Japan

[21] Appl. No.: 645,566

[22] Filed: May 14, 1996

[30] Foreign Application Priority Data

Jun. 8, 1995 [JP] Japan .................................. 7-141798

[51] Int. Cl.[6] .............................. G06K 9/36; G06K 9/46
[52] U.S. Cl. ...................... 382/233; 382/238; 348/410; 348/420
[58] Field of Search ................................. 382/233, 238, 382/240; 358/430, 433; 348/409, 410, 411, 420, 421, 400, 401

[56] References Cited

U.S. PATENT DOCUMENTS

| | | | |
|---|---|---|---|
| 4,386,366 | 5/1983 | Mori | 358/430 |
| 4,811,112 | 3/1989 | Rutledge | 358/430 |
| 5,287,420 | 2/1994 | Barrett | 382/233 |

Primary Examiner—Leo Boudreau
Assistant Examiner—Phuoc Tran
Attorney, Agent, or Firm—Armstrong, Westerman, Hattori, McLeland & Naughton

[57] ABSTRACT

An apparatus for reproducing original image data from compressed image data, supplied thereto as a plurality of separate data blocks, each data block including a plurality of compressed pixel data arranged in a matrix form of rows and columns. The apparatus includes a reproducing circuit for sequentially reproducing a plurality of original pixel data, block by block, by subjecting the compressed pixel data of each data block to data expansion; and a Differential Pulse Code Modulation (DPCM) encoder, coupled to the reproducing circuit, for performing DPCM encoding on each reproduced pixel data supplied from the reproducing circuit to sequentially produce a plurality of DPCM code data. The apparatus further includes an image memory, coupled to the DPCM encoder, for storing the DPCM code data supplied from the DPCM encoder. The DPCM encoder predicts a value of reproduced pixel data to be encoded subsequent to reproduced pixel data currently being encoded, calculates a difference between the predicted value and a real value of the reproduced pixel data to be subsequently encoded, and produces DPCM code data having a code determined in accordance with the calculated difference.

5 Claims, 9 Drawing Sheets

IMAGE DATA REPRODUCING APPARATUS

BACKGROUND OF THE INVENTION

1. Field of the Invention

The present invention generally relates to an apparatus which reproduces original image data from compressed or encoded image data according to predetermined rules. More particularly, this invention relates to an apparatus for reducing the capacity of a memory for temporarily storing reproduced original image data.

2. Description of the Related Art

It is important to compress image data to reduce the amount of data for efficient transfer and storage of image data. Recently, JPEG (Joint Photographic Coding Experts Group) is working to establish international standards for the coding system for color still pictures. The JPEG coding system is called a JPEG algorithm which is widely used in systems using various strange media (such as, CD-ROMs).

According to the data compression by the JPEG algorithm, one picture is separated to a plurality of blocks B11 to Bmn, each consisting of 8×8 pixel data a1 to h8 as shown in FIG. 1; and sixty-four (64) pieces of pixel data are subjected to a coding process block by block. FIG. 2 illustrates an encoding circuit (JPEG encoder) which performs coding according to the JPEG algorithm. This JPEG encoder includes a DCT (Discrete Cosine Transform) circuit 1, a quantizer 2, an encoding circuit 3, a threshold value table 4 and a Huffman table 5.

The DCT circuit 1 receives one block (64 pixels) of image data and executes two-dimensional DCT to produce sixty-four (64) DCT coefficient data. The quantizer 2 quantizes the DCT coefficient data supplied from the DCT circuit 1 while referring to the threshold value that is stored in the threshold value table 4. This threshold value determines the compression rate of image data and the quality of reproduced image, and such threshold value can be arbitrarily set in accordance with the purpose of the usage of the encoder. The encoding circuit 3 performs variable length coding on the quantized DCT coefficient data in accordance with the Huffman codes stored in the Huffman table 5 in order to produce compressed image data. The Huffman codes are variable-length codes which are assigned to the individual quantized DCT coefficient data. A short code is to be assigned to the DCT coefficient having a frequency of occurrence that has been predicted to be high. Through the above-discussed encoding, the JPEG encoder compresses image data to as small as a range of 1/5 to 1/40.

A decoding circuit (JPEG decoder), which performs decoding in accordance with the JPEG algorithm, includes a decoding circuit, a dequantizer, an IDCT (Inverse Discrete Cosine Transform) circuit, a Huffman table and a threshold value table. The JPEG decoder executes a reproduction (or expansion) process on compressed image data in accordance with the JPEG algorithm in order to reproduce image data. In other words, the JPEG decoder performs the inverse processing to the above-described compression process of the JPEG encoder.

FIG. 3 illustrates a block diagram showing a conventional image data reproducing apparatus using the JPEG decoder. This apparatus includes a JPEG decoder 11, a frame memory (or image memory) 12, a FIFO (First-In First-Out) memory 13 and a display controller 14.

The decoder 11 supplies reproduced image data to the frame memory 12 block by block. The frame memory 12 temporarily stores the reproduced image data block by block. The frame memory 12 is designed so as to temporarily store one frame of image data in accordance with a request from the monitor side which displays image data. The frame memory 12 is also designed in such a way as to alter the aligning order of the reproduced image data supplied from the JPEG decoder 11 to the aligning order of reproduced image data to be displayed. In other words, memory addresses are sorted such that a block-by-block sequence of data is changed to a row-by-row sequence of data for individual blocks. For instance, eight pieces of pixel data associated with the first to eighth rows of the first block are respectively written in the first to eighth addresses. Next, eight pieces of pixel data associated with the first to eighth rows of the second block are respectively written in the ninth to sixteenth addresses. In this manner, reproduced image data of each block are stored in the frame memory 12 in a sequential order on the row-by-row base. Therefore, by sequentially reading pixel data starting from the first address, reproduced image data to be displayed can be acquired.

The FIFO 13 temporarily stores image data read from the frame memory 12 in order to adjust the output timing of the image data. The display controller 14 supplies write and read address signals for image data to the frame memory 12 in order to control the frame memory 12 in such a manner that image data is outputted in a predetermined order. The display controller 14 also controls the output timing of image data from the FIFO 14 in order to match with the timing at which a processing apparatus (such as, a display processor (not shown)) starts processing reproduced image data. The display processor converts reproduced image data to image signals according to the format of the display. That is, image data signals compressed block by block are converted to frame-by-frame image signals according to the format of the display device (such as, a TV monitor).

In the above-described image data reproducing apparatus, the frame memory 12 needs a memory capacity in order to store at least one frame of reproduced image data. This requirement is one factor which increases the manufacturing cost. When one color component of a color image is expressed by eight bits, for example, twenty-four (24) bits (8 bits×3 primary colors) are needed for one pixel data. Therefore, the amount of image data for one frame having 640×400 pixels becomes approximately 6 Mbits (640×400×24). In this case, the frame memory 12 needs a capacity of at least 6 Mbits.

SUMMARY OF THE INVENTION

The present invention relates to an image data reproducing apparatus having a frame memory with a reduced memory capacity.

More particularly, the present invention relates to an apparatus for reproducing original image data from compressed image data, supplied thereto as a plurality of separate data blocks, each data block including a plurality of compressed pixel data arranged in a matrix form of rows and columns. The apparatus includes a reproducing circuit for sequentially reproducing a plurality of original pixel data, block by block, by subjecting the compressed pixel data of each data block to data expansion; and a Differential Pulse Code Modulation (DPCM) encoder, coupled to the reproducing circuit, for performing DPCM encoding on each reproduced pixel data supplied from the reproducing circuit to sequentially produce a plurality of DPCM code data. The apparatus further includes an image memory, coupled to the DPCM encoder, for storing the DPCM code data supplied from the DPCM encoder. The DPCM encoder predicts (estimates) a value of reproduced pixel data to be encoded subsequent to reproduced pixel data currently being encoded, calculates a difference between the predicted value and a real value of the reproduced pixel data to be subsequently encoded, and produces DPCM code data having a code determined in accordance with the calculated difference.

Other aspects and advantages of the invention will become apparent from the following description, taken in conjunction with the accompanying drawings, illustrating by way of examples the structural arrangements of this invention.

DETAILED DESCRIPTION OF THE PREFERRED EMBODIMENTS

Figure 4:
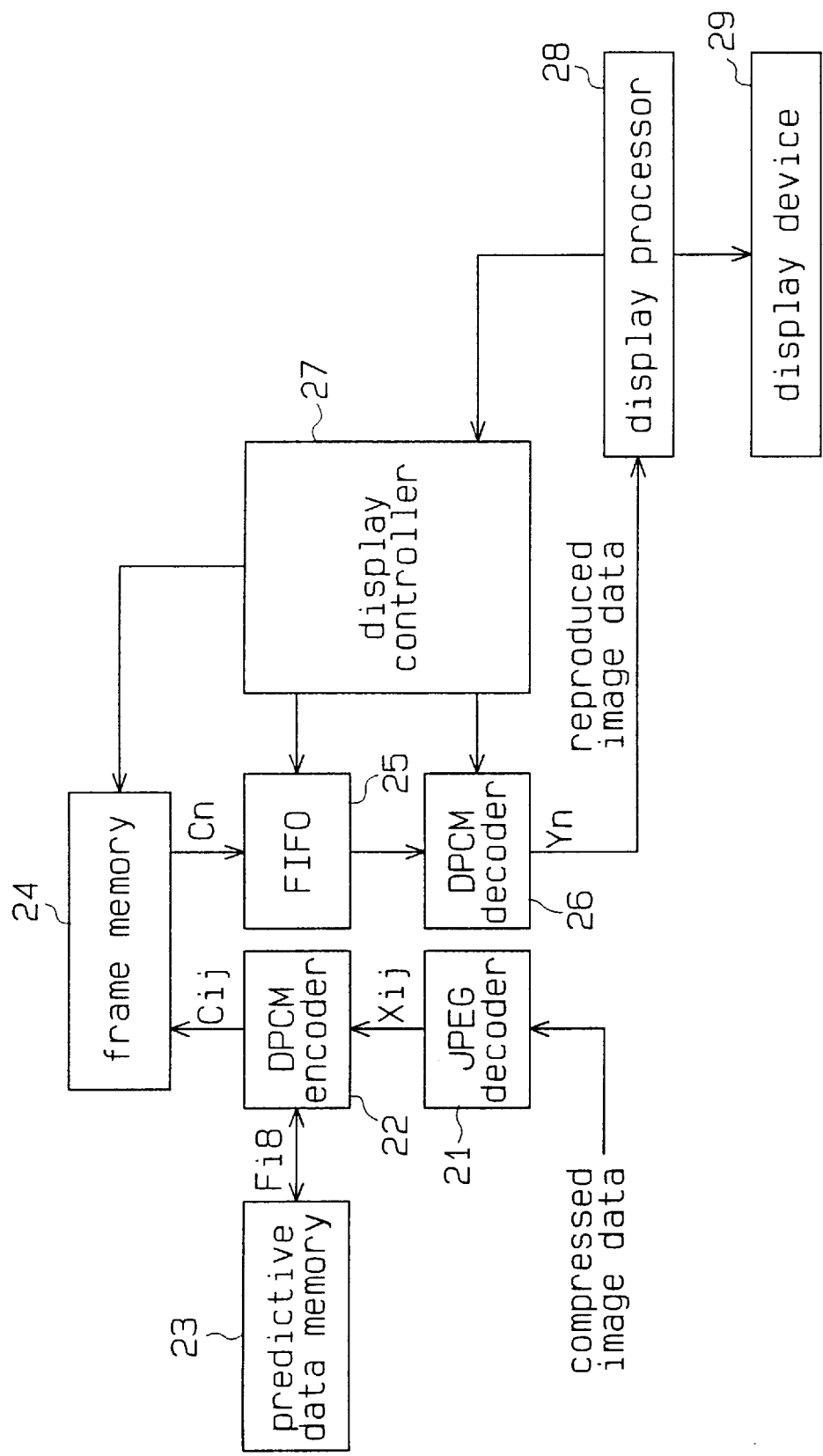
FIG. 4 is a block diagram illustrating an image data reproducing apparatus according to one embodiment of this invention.

An image data reproducing apparatus according to one embodiment of the present invention will be now described in reference to the accompanying drawings. As shown in FIG. 4, the image data reproducing apparatus comprises a JPEG decoder 21 as a reproducing circuit, a DPCM (Differential Pulse Code Modulation) encoder 22, a predictive data memory 23 connected to the DPCM encoder 22, a frame memory 24, a FIFO memory 25, a DPCM decoder 26 and a display controller 27. The JPEG decoder 21 performs a reproduction (or expansion) process on image data, compressed according to the JPEG algorithm, block by block (each block consisting of image data of 8 rows×8 columns). The reproduced original image data is comprised of 64 pixels of image data $X_{ij}$ (i: a to h, and j: 1 to 8).

Figure 5:
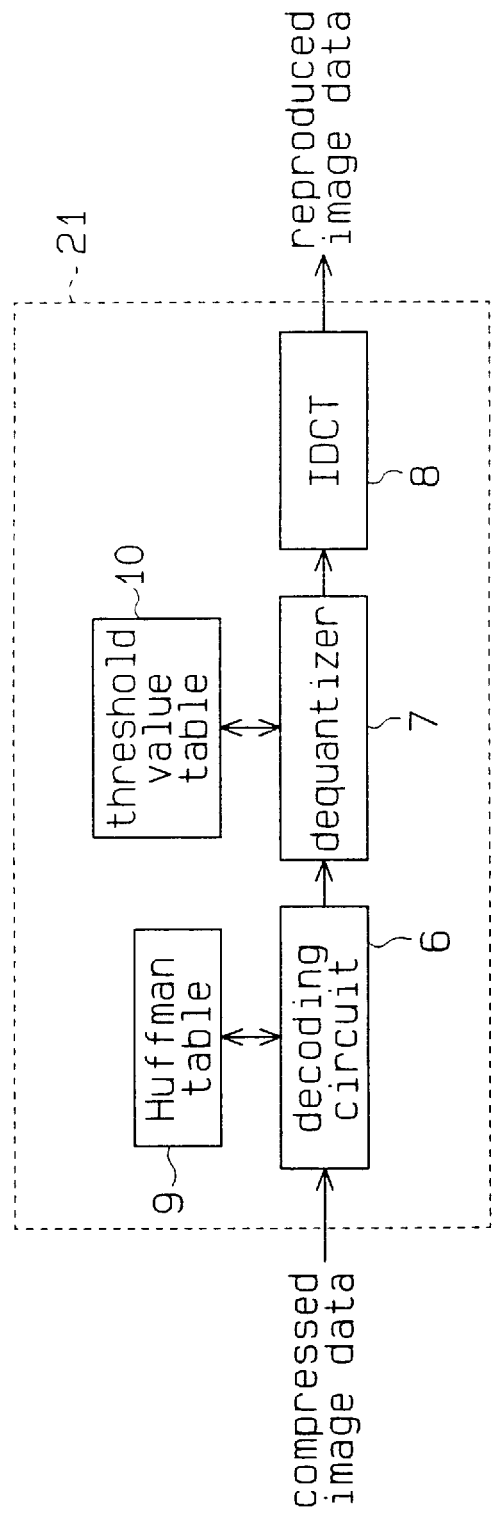
FIG. 5 is a block diagram showing a JPEG decoder included in the image data reproducing apparatus.

FIG. 5 is a block diagram showing the JPEG decoder 21. The JPEG decoder 21 includes a decoding circuit 6, a dequantizer 7, an IDCT(Inverse Discrete Cosine Transform) circuit 8, a Huffman table 9 and a threshold value table 10. The decoding circuit 6 receives one block of compressed image data and performs variable length decoding on the compressed image data in accordance with the Huffman codes stored in the Huffman table 9. This variable length decoding is executed to acquire DCT coefficient data quantized by the JPEG encoder (not shown) which has supplied the compressed image data. The Huffman codes correspond to the Huffman codes used by the JPEG encoder. The dequantizer 7 performs dequantization on the quantized coefficient data while referring to the threshold value stored in the threshold value table 10, and reproduces DCT coefficient data. This threshold value corresponds to the threshold value that has been used by the JPEG encoder. The IDCT circuit 8 performs IDCT on the DCT coefficient data supplied from the dequantizer 7 to reproduce image data. The IDCT processing is performed one block data at a time so that pixel data $X_{ij}$ which forms reproduced image data are continuously outputted in a predetermined order.

Figure 1:
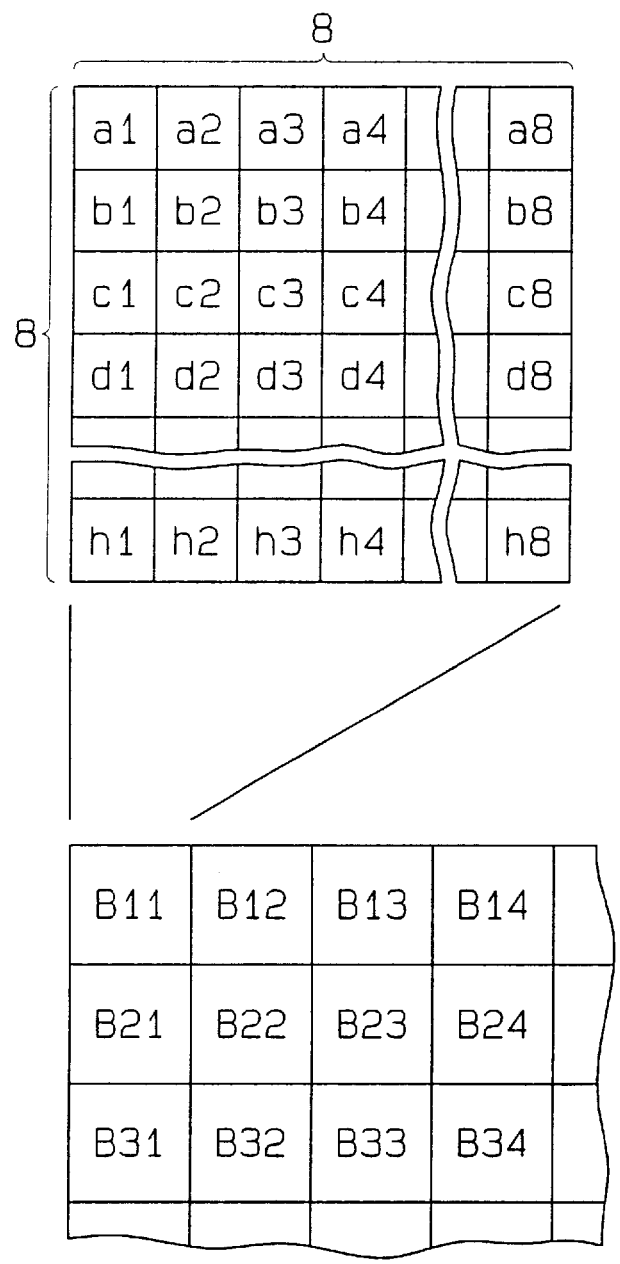
FIG. 1 illustrates the structure of image data to be processed according to the JPEG algorithm.
Figure 2:
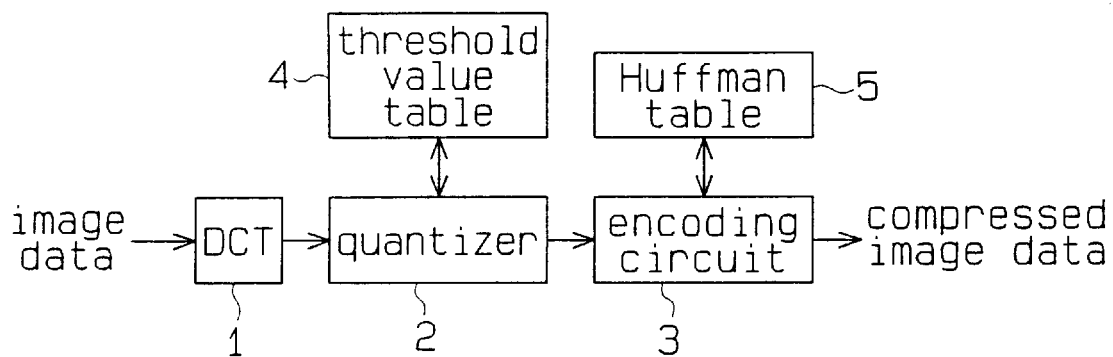
FIG. 2 is a block diagram showing a conventional JPEG encoder.
Figure 3:
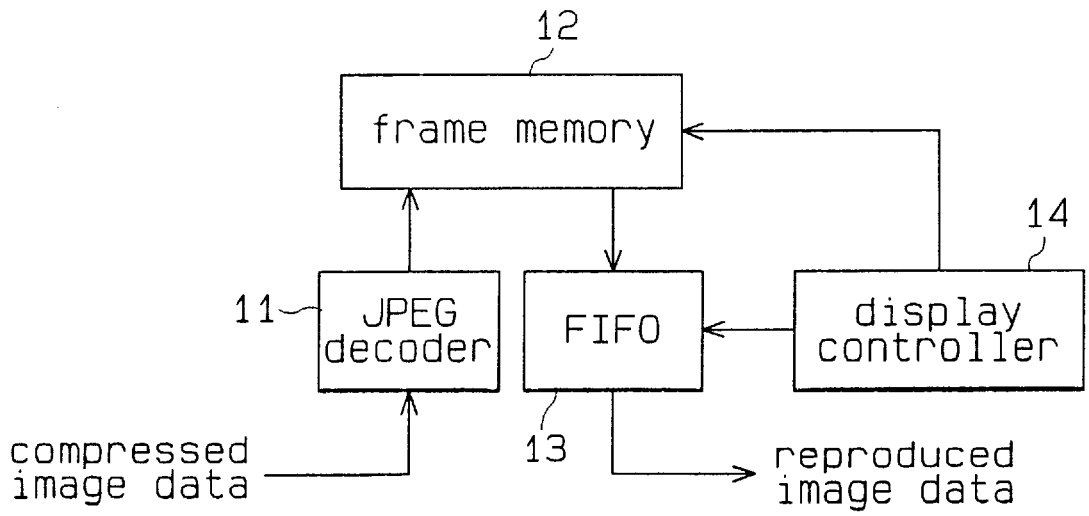
FIG. 3 is a block diagram depicting a conventional image data reproducing apparatus.

As shown in FIG. 4, the DPCM encoder 22 receives the pixel data $X_{ij}$, sequentially supplied from the JPEG decoder 21 and predicts (estimates) data to be supplied next to the received pixel data. The DPCM encoder 22 further computes the difference between the value of the predicted pixel data and the value of the actual pixel data as predictive error data. The DPCM encoder 22 assigns a code to the predictive error data to produce code data $C_{ij}$. The predictive data memory 23 stores eight pieces of predicted pixel data $F_{i8}$ produced by the DPCM encoder 22 based on data $X_{i8}$ of eight pixels (a8 to h8) in the eighth column in the first block as shown in FIG. 1. Such predicted pixel data $F_{i8}$ are used to encode data $X_{a1}$ to $X_{h1}$ of eight pixels (a1 to h1) in the first column in the second block adjacent to the first block. Consequently, the DPCM encoder 22 is allowed to execute the DPCM process block by block using the eight predicted pixel data $F_{i8}$. (The details of the DPCM encoder 22 will be discussed later.)

The frame memory 24 temporarily stores the code data $C_{ij}$, sequentially supplied for each block from the DPCM encoder 22, for each frame. As the code data $C_{ij}$ to be written in the frame memory 24 has been compressed, the frame memory 24 needs less memory capacity than that of the conventional image data reproducing apparatus. The frame memory 24 sorts the write addresses in such a manner that the code data $C_{ij}$ are to be written in accordance with the data alignment of the reproduction frame corresponding to the raster scan.

Figure 6:
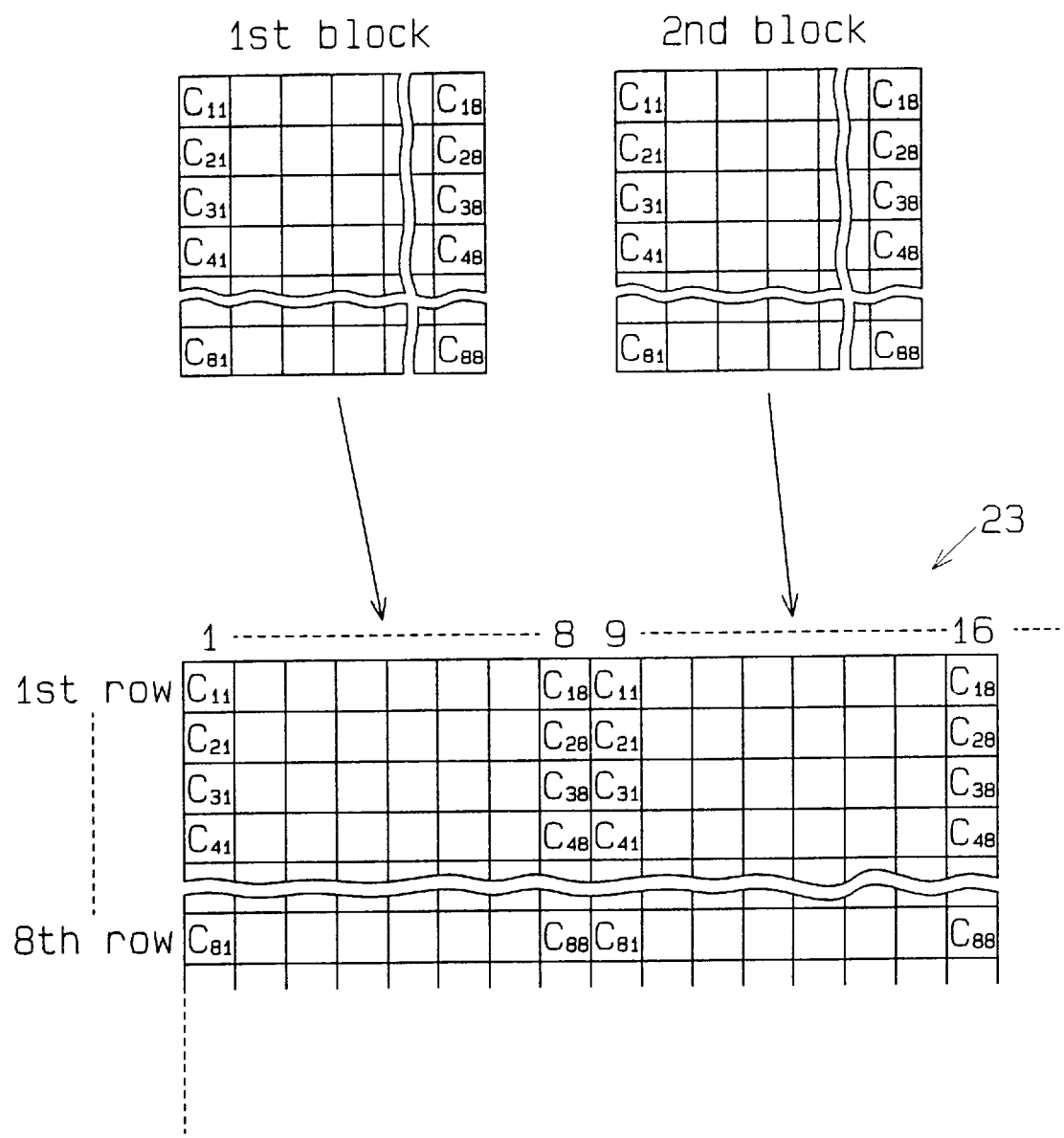
FIG. 6 is a diagram showing code data to be stored in a frame memory.

As shown in FIG. 6, for example, code data $C_{11}$ to $C_{18}$ for eight pixels associated with the first row in the first block are written in the first to eighth addresses associated with the first row of the frame memory 24. Likewise, code data $C_{21}$ to $C_{28}$, ..., or $C_{81}$ to $C_{88}$ for eight pixels associated with the second row to the eighth row are written in the first to eighth addresses associated with the second row to the eighth row, respectively. Next, code data $C_{11}$ to $C_{18}$, ..., or $C_{81}$ to $C_{88}$ for the individual pixels associated with each row in the second block to be supplied next to the first block are written in the ninth to sixteenth addresses associated with the first to eighth rows in the frame memory 24, respectively. Accordingly, a so-called raster block conversion is performed which converts the alignment order of the code data $C_{ij}$ to the alignment order of the raster-scan based reproduced image data. One memory area in the predictive data memory 23 and frame memory 24 may be separated into a plurality of sub-areas in the actual use.

The FIFO 25 temporarily stores code data $C_n$, read out in a predetermined order from the frame memory 24, row by row, for example, and supplies the code data to the DPCM decoder 26 at a given timing while keeping the data alignment order. In this example, "$C_{ij}$" indicative of code data at the time of writing code data into the frame memory 24 is changed to "$C_n$" through the conversion of the data alignment order.

The DPCM decoder 26 decodes the consecutive code data $C_n$ to reproduce predictive error data, and adds the reproduced predictive error data to the predicted pixel data to sequentially reproduce pixel data $Y_n$ corresponding to the actual pixel data $X_{ij}$. This pixel data $Y_n$ is sequentially supplied to a display processor 28 which converts the pixel data to image signals according to the format of a display device (or monitor) 29 for displaying a reproduced image.

In response to a data-transfer instruction signal from the display processor 28, the display controller 27 controls the read timing for the code data $C_n$ from the frame memory 24 or the FIFO 25 and the timing for the decoding process by the DPCM decoder 26. Consequently, the operations of the individual circuits 24, 25 and 26 are synchronized with the operation of the monitor so that the code data $C_n$ is supplied to the display processor 28 at the proper timing. When an image represented by the pixel data $Y_n$ is to be printed using a printer (not shown), not the display device 29, the output timing for the data $Y_n$ need not be controlled, thereby eliminating the need for the FIFO 25.

Figure 7:
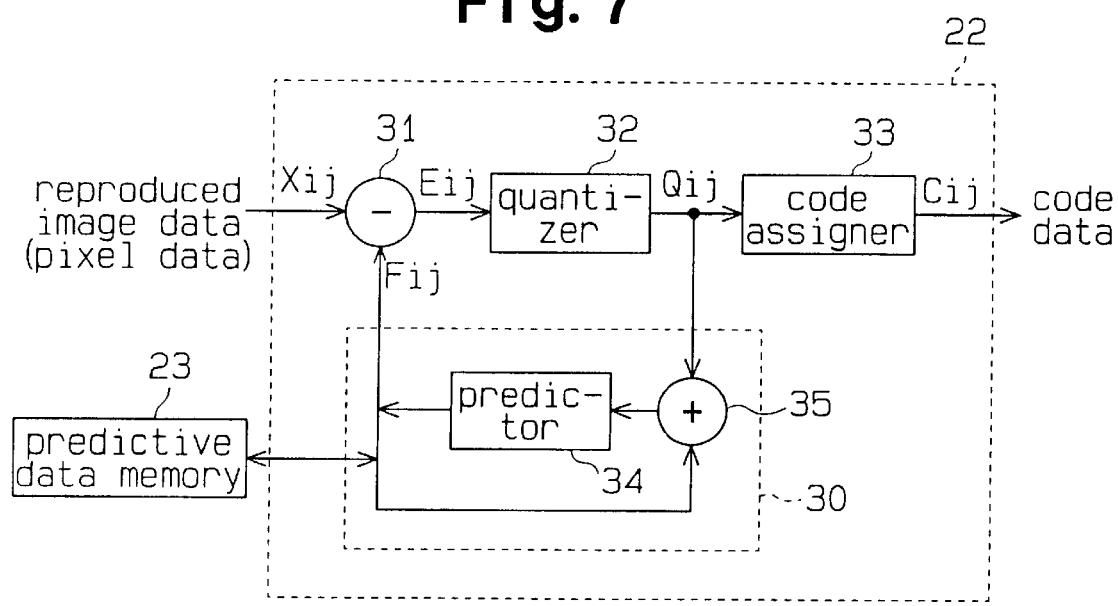
FIG. 7 is a block diagram showing a DPCM encoder included in the image data reproducing apparatus.

FIG. 7 illustrates a block diagram showing the DPCM encoder 22. The following description is provided in the case of executing the forward prediction that produces one predicted pixel data by using the code data, which has been encoded immediately before the pixel data currently undergoing the encoding process. The DPCM encoder 22 includes a local decoder 30, a subtracter 31, a quantizer 32 and a code assigner 33. The subtracter 31 receives the image data $X_{ij}$ and subtracts the predicted pixel data $F_{ij}$ from the image data $X_{ij}$ to produce predictive error data $E_{ij}$. The quantizer 32 quantizes the predictive error data $E_{ij}$ using several predetermined values to produce quantized data $Q_{ij}$. To reduce the quantization-oriented error, fine representative values are preset for predictive error data which indicates a high frequency of occurrence. When the pixel data $X_{ij}$ consists of four bits, for example, thirty-one (31) kinds of predictive error data, −15 to +15, are producible, whereas the preset representative values are −15, −8, −4, −2, −1, 0, 1, 2, 4, 8 and 15.

The code assigner 33 assigns a predetermined code to the quantized data $Q_{ij}$ supplied from the quantizer 32 to produce code data $C_{ij}$. The codes to be assigned have been previously set so that a short code is to be given to data which shows a high frequency of occurrence. The local decoder 30 receives the quantized data $Q_{ij}$ from the quantizer 32 and decodes the data to produce predicted pixel data $F_{ij}$. This predicted pixel data $F_{ij}$ is supplied to the subtracter 31. The local decoder 30 includes a predictor 34 and an adder 35. The predictor 34 temporarily retains the predicted pixel data $F_{ij}$ and supplies this data to the subtracter 31 and the adder 35. The adder 35 adds the quantized data $Q_{ij}$ to the current predicted pixel data to produce next predicted pixel data $F_{ij+1}$. Connected to the local decoder 30 is the predictive data memory 23, which temporarily stores the predicted pixel data $F_{is}$ corresponding to the pixels of the first column of each block, supplied from the predictor 35. As is apparent from the above, the DPCM encoder 22 can execute DPCM processing of the pixel data $X_{ij}$ supplied block by block.

Figure 8:
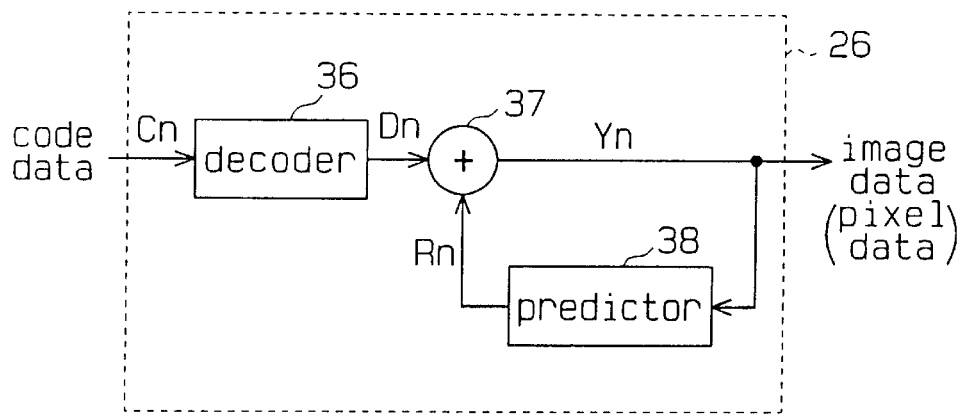
FIG. 8 is a block diagram showing a DPCM decoder included in the image data reproducing apparatus.

FIG. 8 is a block diagram illustrating the DPCM decoder 26 associated with the DPCM encoder 22. The DPCM decoder 26 has a decoder 36, an adder 37 and a predictor 38. The decoder 36, associated with the code assigner 33 of the DPCM encoder 22, decodes the code data $C_n$ supplied from the FIFO 25 to produce the quantized data $Q_{ij}$ and executes dequantization on the quantized data $Q_{ij}$ to reproduce predictive error data $D_n$. The adder 37 adds predicted pixel data $R_n$ to the predictive error data $D_n$ to produce actual pixel data $Y_n$. The predictor 38 receives the result of addition by the adder 37 or the pixel data $Y_n$, and produces predicted pixel data $R_n$ which is delayed by one data period from the pixel data $Y_n$. This predicted pixel data $R_n$ is supplied to the adder 37. As a result, the pixel data $Y_n$, which corresponds to the pixel data $X_{ij}$ supplied from the JPEG decoder, is reproduced from the code data $C_n$ which is read from the frame memory 24.

A description will be now given on how the DPCM encoder 22 processes the pixel data $X_{ij}$ for each block $B_{mn}$, each block including 8×8 pixels (a1 to h8), as shown in FIG. 1.

Figure 9:
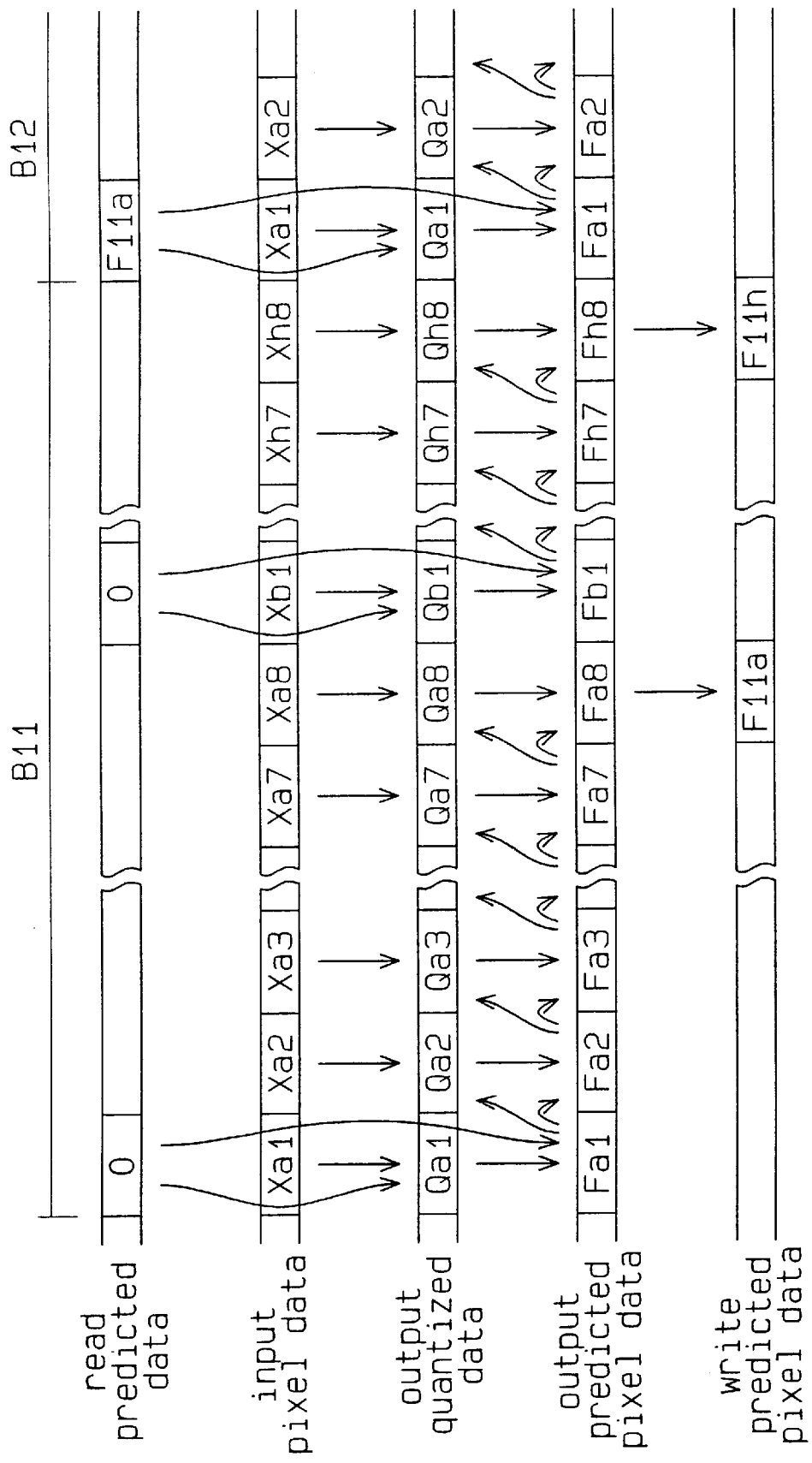
FIG. 9 shows a timing chart illustrating the first operation of the DPCM encoder.
Figure 10:
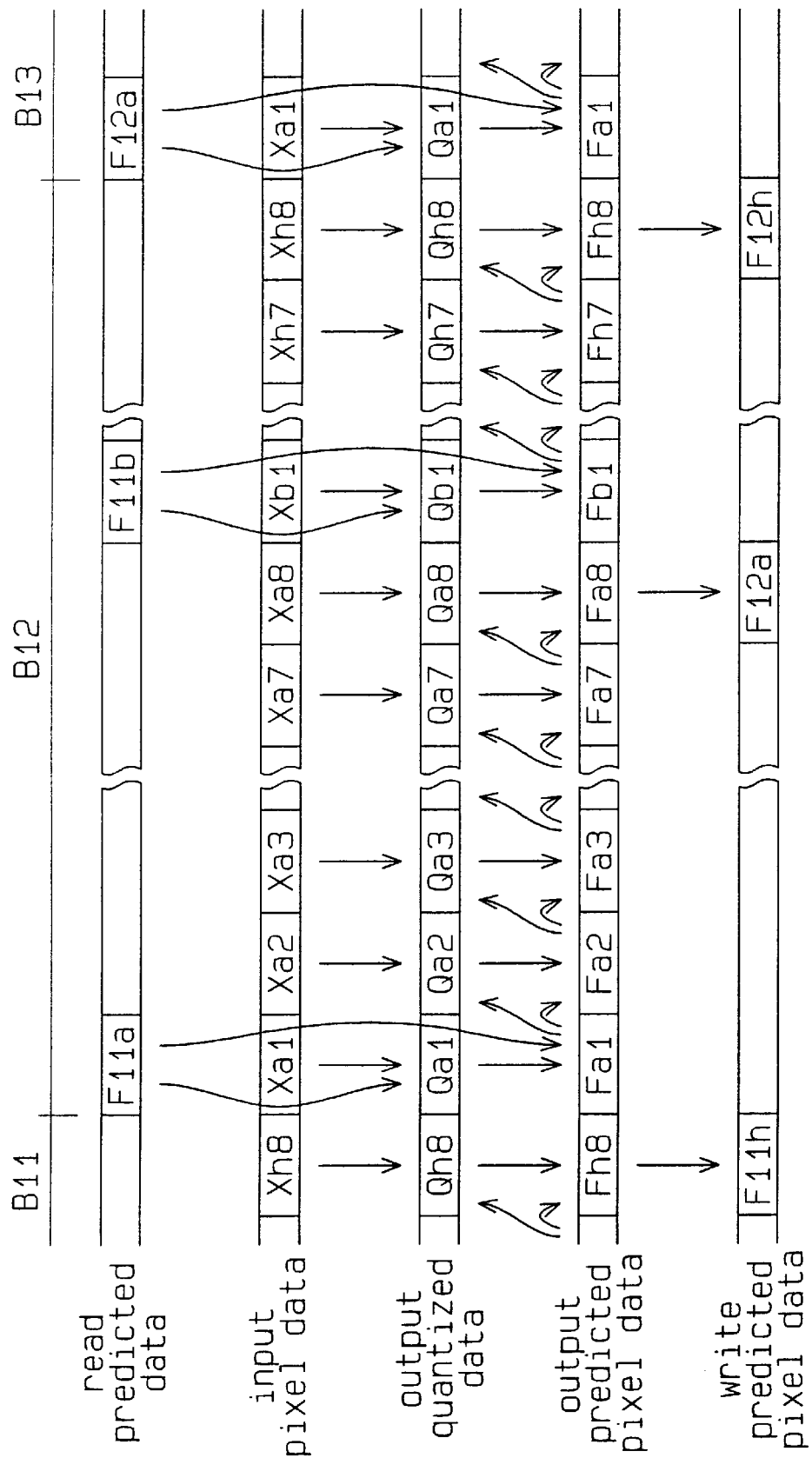
FIG. 10 presents a timing chart illustrating the second operation of the DPCM encoder.

FIGS. 9 and 10 illustrate timing charts showing the operation of the DPCM encoder 22. Initially, the processing of the block B11 located on the left end on the frame will be discussed (same is applicable to blocks B21, B31 and so forth). As shown in FIG. 9, when receiving pixel data $X_{a1}$ of a pixel a1 at the upper left corner of the block B11, the subtracter 31 passes the image data $X_{a1}$ directly and supplies it to the quantizer 32 as predictive error data $E_{a1}$. The predictive error data $E_{a1}$ is converted to quantized data $Q_{a1}$ by the quantizer 32. As a "0" signal is supplied from the predictor 34 in the initialized state at this time, the subtracter 31 substantially performs no subtraction. The code assigner 33 converts the quantized data $Q_{a1}$ to code data $C_{a1}$ which is in turn supplied to the frame memory 24. At the same time, the adder 35 receives the quantized data $Q_{a1}$ and directly passes the data to the predictor 34 as predicted pixel data $F_{a1}$. As a "0" signal is supplied from the predictor 34 in the initialized state at this time, the adder 35 substantially performs no addition.

The instant data $X_{a2}$ of a pixel a2 adjacent on the right to the pixel a1 is supplied to the subtracter 31, the predictor 34 supplying the predicted pixel data $F_{a1}$ to the subtracter 31. The subtracter 31 subtracts the predicted pixel data $F_{a1}$ from the pixel data $X_{a2}$ in order to produce quantized data $Q_{a2}$ by the quantizer 32. The quantized data $Q_{a2}$ is then converted to code data $C_{a2}$ by the code assigner 33. The adder 35 adds the predicted pixel data $F_{a1}$ to the quantized data $Q_{a2}$ and the addition result is in turn supplied as new predicted pixel data $F_{a2}$ to the predictor 34. The predictor 34 supplies this predicted pixel data $F_{a2}$ to the subtracter 31 at the same time as the next pixel data $X_{a3}$ is supplied to the subtracter 31.

The same processing is likewise performed on data $X_{a3}$ to $X_{a8}$ of pixels a3 to a8 in order to produce quantized data $Q_{a3}$ to $Q_{a8}$ and predicted pixel data $F_{a3}$ to $F_{a8}$. Among such data, the predicted pixel data $F_{a8}$ for the data $X_{a8}$ of the pixel a8 located in the first row and the eighth column (right end in the block) is supplied to the predictive data memory 23 to be stored, not the subtracter 31, from the predictor 34. This predicted pixel data $F_{a8}$ is used as the last predicted pixel data $F_{11a}$ of the first row in the block B11. Data $X_{b1}$–$X_{b8}$, . . . , and $X_{h1}$–$X_{h8}$ of pixels b1–b8, . . . , and h1–h8 in the second and subsequent rows of the block B11 are processed in the same way as done for the pixel data $X_{a1}$–$X_{a8}$ of the first row, thereby yielding quantized data $Q_{b1}$–$Q_{b8}$, . . . , and $Q_{h1}$–$Q_{h8}$ and predicted pixel data $F_{b1}$–$F_{b8}$, . . . , and $F_{h1}$–$F_{h8}$. Among such, the predicted pixel data $F_{b1}$–$F_{b8}$, . . . , and $F_{h8}$ corresponding to the data $X_{b8}$, . . . and $X_{h8}$ of the last pixels b8, . . . , and h8 in the individual rows are written in the predictive data memory 23 as last predicted pixel data $F_{11b}$, . . . , and $F_{11h}$ of the individual rows in the block B11.

A description will be now given with respect to the processing of the block B12 adjacent on the right side to the block B11 (the same is applicable to blocks B22, B32 and so forth, respectively, adjoining the blocks B21, B31 and so forth). As shown in FIG. 10, the subtracter 31 receives pixel data $X_{a1}$ of a pixel a1 at the upper left corner of the block B12 and the predicted pixel data $F_{11a}$ stored in the predictive data memory 23. The subtracter 31 subtracts the predicted pixel data $F_{11a}$ from the pixel data $X_{a1}$ to compute predictive error data $E_{a1}$. This predictive error data $E_{a1}$ is converted by the quantizer 32 to quantized data $Q_{a1}$ which is in turn converted to code data $C_{a1}$ by the code assigner 33. The quantized data $Q_{a1}$ is also supplied to the adder 35. The adder 35 adds the last predicted pixel data $F_{11a}$ read from the predictive data memory 23, to the quantized data $Q_{a1}$, and the addition result is in turn supplied as new predicted pixel data $F_{a1}$ to the predictor 34. The predictor 34 supplies this predicted pixel data $F_{a1}$ to the adder 31 at the same time as the time when the next pixel data $X_{a2}$ is supplied to the subtracter 31.

The same processing as done for the block B11 is performed on data $X_{a2}$ to $X_{a8}$ of pixels a2 to a8 in order to produce quantized data $Q_{a2}$ to $Q_{a8}$ and the last predicted pixel data $F_{a2}$ to $F_{a8}$. The predicted pixel data $F_{a8}$ is written in the predictive data memory 23 as the last predicted pixel data $F_{12a}$ of the first row in the block B12. The same processing as done for the block B11 is performed on data $X_{b1}$–$X_{b8}$, ..., and $X_{h1}$–$X_{h8}$ of pixels b1–b8, ..., and h1–h8 in the second and subsequent rows of the block B12 are processed.

The same processing as done for the block B12 is likewise performed on blocks B13 to B1n (the same is applicable to the blocks B23–B2n, B33–B3n, and so forth), yielding quantized data $Q_{a1}$–$Q_{h8}$ and predicted pixel data $F_{a1}$–$F_{h8}$. The data to be stored in the predictive data memory 23 is rewritten block by block. Therefore, the memory 23 should have a capacity large enough to store eight last predicted pixel data $F_{mna}$ to $F_{mnh}$ for each of eight rows. Accordingly, when the predicted pixel data consists of four bits, the memory capacity should be large enough for 96 bits (4 bits×8×3 components). The above-discussed structural arrangement allows the DPCM processing to be executed using the predictive data memory 23 with a small memory capacity. Such DPCM processing permits code data $C_{ij}$ consisting of less than eight bits pixel data $X_{ij}$ to be stored in the frame memory 24. The predictive data memory 23 and DPCM encoder 22 may be constituted together with the JPEG decoder 21 on a single chip. Because the JPEG decoder 21 is comprised of a high-performance arithmetic operation unit (such as, a DSP (Digital Signal Processor)), the single-chip structure may be accomplished by providing the DSP with the DPCM function.

Figure 11:
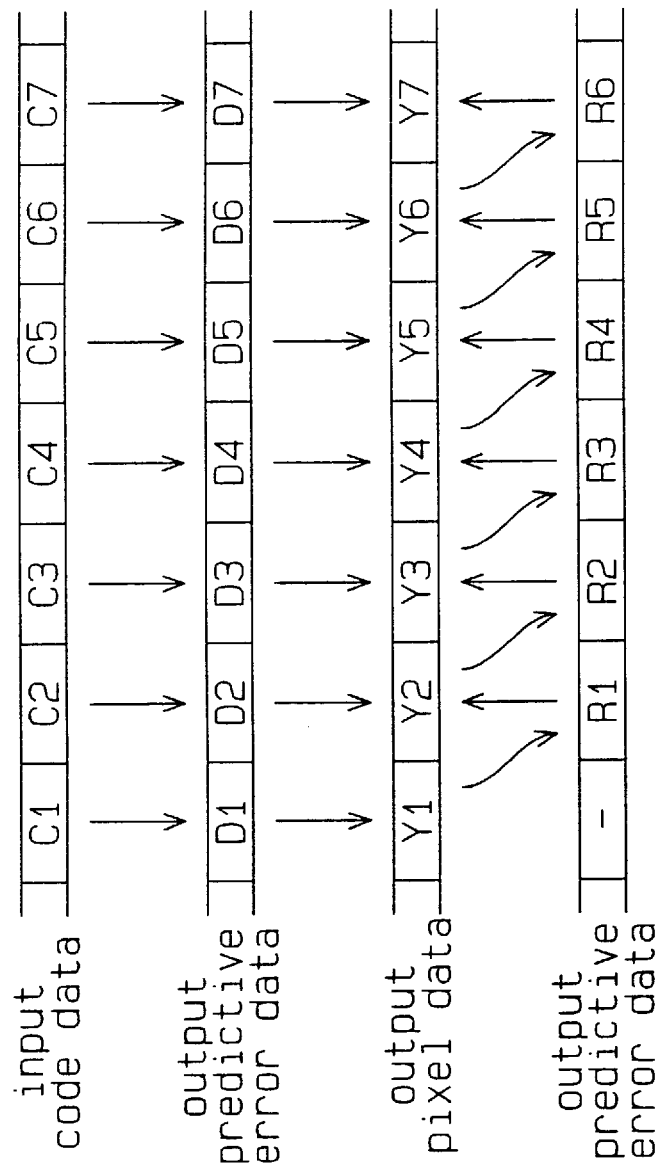
FIG. 11 is a timing chart illustrating the operation of the DPCM decoder.

The operation of the DPCM decoder 26 will be now discussed. FIG. 11 is a timing chart illustrating the operation of the DPCM decoder 26. The decoder 36 receives code data $C_1$ and converts it to predictive error data $D_1$. The adder 37 passes the predictive error data $D_1$ and supplies it as pixel data $Y_1$ to the display processor 28, and simultaneously supplies the predictive error data $D_1$ as predicted pixel data $R_1$ to the predictor 38. Because no data is supplied from the initialized predictor 38 at this time, the adder 37 does not perform any addition.

Subsequently, the decoder 36 receives code data $C_2$ and converts it to predictive error data $D_2$ which is in turn supplied to the adder 37. At the same time, the predictor 38 supplies the predicted pixel data $R_1$ to the adder 37. The adder 37 adds the predicted pixel data $R_1$ and the predictive error data $D_2$ to produce pixel data $Y_2$. Such pixel data $Y_2$ is supplied directly to the display processor 28, and is supplied as predicted pixel data $R_2$ to the predictor 38. Such predicted pixel data $R_2$ is supplied to the adder 37 at the same time as when the next code data $C_3$ is supplied to the decoder 36.

Thereafter, the same processing as done for the code data $C_2$ is performed on code data $C_3$, $C_4$, $C_5$ and so forth, which are sequentially supplied, thereby yielding pixel data $Y_3$, $Y_4$, $Y_5$ and so forth, and predicted pixel data $R_3$, $R_4$, $R_5$ and so forth. At this time, the code data $C_n$ are aligned along the horizontal scan lines of the reproduction frame. The DPCM decoder 26 can therefore perform decoding data by data, unlike the processing block by block performed by the DPCM encoder 22, so that the DPCM decoder 26 does not require a predictive data memory for temporarily storing the predicted pixel data $R_n$.

Although only one embodiment of the present invention has been described herein, it should be apparent to those skilled in the art that the present invention may be embodied in many other specific forms without departing from the spirit or scope of the invention. Particularly, it should be understood that this invention may be provided in the following embodiments.

This invention may be adapted to the system which compresses image data for each predetermined block, as well as to the system which compresses image data according to the JPEG algorithm. In the DPCM processing, secondary prediction which produces two predicted pixel data may be employed in addition to the forward prediction that produces one predicted pixel data by using the code data, which has been encoded immediately before the pixel data currently undergoing the encoding process. In this case, the capacity of the predictive data memory should be increased to be able to store predictive data associated with one row of pixels in the individual columns in addition to eight last predicted pixel data $F_{mna}$ to $F_{mnh}$. When one frame consists of 640×400 pixels, for example, the memory capacity should be increased so as to additionally store predicted pixel data associated with 640 pixels. This secondary prediction allows the DPCM process to be performed on the pixel data in both the horizontal direction and vertical direction.

The above description is included to illustrate the structural arrangements and operations of the preferred embodiments and is not meant to limit the scope of the invention. The scope of the invention is to be limited only by the following claims. From the above discussion, many variations are apparent to one skilled in the art which would yet be encompassed by the spirit and scope of the invention.

What is claimed is:

1. An apparatus for reproducing original image data from compressed image data, supplied thereto as a plurality of separate data blocks, each data block including a plurality of compressed pixel data arranged in a matrix form of rows and columns, said apparatus comprising:

a reproducing circuit for sequentially reproducing a plurality of original pixel data, block by block, by subjecting the compressed pixel data of each data block to data expansion;

a Differential Pulse Code Modulation (DPCM) encoder, coupled to said reproducing circuit, for performing DPCM encoding on each reproduced pixel data supplied from said reproducing circuit to sequentially produce a plurality of DPCM code data;

an image memory, coupled to said DPCM encoder, for storing said DPCM code data supplied from said DPCM encoder, wherein said DPCM encoder predicts a value of reproduced pixel data to be encoded subsequent to reproduced pixel data currently being encoded, calculates a difference between the predicted value and a real value of said reproduced pixel data to be subsequently encoded, and produces DPCM code data having a code determined in accordance with the calculated difference, and wherein the encoding time of one block of reproduced pixel data by said DPCM encoder is shorter than the reproducing time of one block of original pixel data by said reproducing circuit; and a Differential Pulse Code Modulation (DPCM) decoder, coupled to said image memory, for performing a DPCM decoding process, associated with said DPCM encoding process of said DPCM encoder, on said DPCM code data input from said image memory to produce a plurality of original pixel data, block by block, wherein said DPCM decoder provides the plurality of original pixel data to an external device.

2. The apparatus according to claim 1, wherein said compressed image data is provided on each unit of frame, and said image memory stores said DPCM code data, frame by frame.

3. The apparatus according to claim 2, further comprising a predictive value memory coupled to said DPCM encoder, for temporarily storing predictive values of a plurality of reproduced pixel data which are predicted by said DPCM encoder during encoding a last column of each data block, wherein said DPCM encoder inputs one of the predictive values from said predictive value memory at the same time as reproduced pixel data belonging to a first column of a data block to be subsequently processed is supplied.

4. The apparatus according to claim 1, further comprising a Differential Pulse Code Modulation (DPCM) decoder, coupled to said image memory, for performing a DPCM decoding process, associated with said DPCM encoding process of said DPCM encoder, on said DPCM code data input from said image memory.

5. The apparatus according to claim 3, further comprising a Differential Pulse Code Modulation (DPCM) decoder, coupled to said image memory, for performing a DPCM decoding process, associated with said DPCM encoding process of said DPCM encoder, on said DPCM code data input from said image memory.

* * * * *